(12) United States Patent
Tarusawa et al.

(10) Patent No.: US 8,100,473 B2
(45) Date of Patent: Jan. 24, 2012

(54) AUTOMOBILE SEAT CAPABLE OF AVOIDING WHIPLASH INJURY

(75) Inventors: Makoto Tarusawa, Hiroshima (JP); Kiyonori Umezaki, Hiroshima (JP); Yasuhito Domoto, Hiroshima (JP)

(73) Assignee: Delta Kogyo Co., Ltd., Hiroshima (JP)

( * ) Notice: Subject to any disclaimer, the term of this patent is extended or adjusted under 35 U.S.C. 154(b) by 220 days.

(21) Appl. No.: 12/550,693

(22) Filed: Aug. 31, 2009

(65) Prior Publication Data

US 2010/0090505 A1    Apr. 15, 2010

(30) Foreign Application Priority Data

Oct. 15, 2008  (JP) ................................ 2008-266534

(51) Int. Cl.
B60N 2/427    (2006.01)
(52) U.S. Cl. .............................. 297/216.12; 297/216.13
(58) Field of Classification Search ............. 297/216.12, 297/216.13, 216.14, 216.1
See application file for complete search history.

(56) References Cited

U.S. PATENT DOCUMENTS

| | | | |
|---|---|---|---|
| 5,795,019 A | 8/1998 | Wieclawski | |
| 7,097,242 B2 * | 8/2006 | Farquhar et al. | 297/216.12 |
| 7,488,035 B2 * | 2/2009 | Kawashima et al. | 297/216.14 |
| 7,597,391 B2 * | 10/2009 | Jayasuriya et al. | 297/216.12 |

FOREIGN PATENT DOCUMENTS

| | | |
|---|---|---|
| DE | 103 14 281 | 8/2004 |
| FR | 2 844 489 | 3/2004 |
| FR | 2 875 189 | 3/2006 |
| GB | 2 318 045 | 4/1998 |
| JP | 10-119619 | 5/1998 |

OTHER PUBLICATIONS

European Search Report (in English language) issued Jan. 29, 2010 in corresponding European Patent Application No. 09168733.5.

* cited by examiner

*Primary Examiner* — Milton Nelson, Jr.
(74) *Attorney, Agent, or Firm* — Wenderoth, Lind & Ponack, LLP

(57) ABSTRACT

An automobile seat includes a swinging motion restraint mechanism for restraining a swinging motion of a sub-frame relative to side frames. The swinging motion restraint mechanism includes a swing axis mounted on the sub-frame, a swinging motion restraint member rotatably mounted on one of the side frames and having a first contact portion and a second contact portion, both of which are brought into contact with the swing axis one at a time, and an elastic member for biasing the swinging motion restraint member toward the swing axis. In an initial state in which no load is applied to a seat back, the first contact portion of the swinging motion restraint member is held in contact with the swing axis, while when a load greater than a predetermined value is inputted to the seat back in a rearward direction, the sub-frame is caused to swing about a hinge to thereby move a headrest forward, and the second contact portion of the swinging motion restraint member is brought into contact with the swing axis, thereby holding the headrest at a position after the movement.

9 Claims, 8 Drawing Sheets

F1×L1=LARGE FORWARD MOMENT
(NORMAL CONDITION)

F2×L2≒0(SMALL FORWARD MOMENT)
(OPERATING CONDITION)

AUTOMOBILE SEAT CAPABLE OF AVOIDING WHIPLASH INJURY

BACKGROUND OF THE INVENTION

1. Field of the Invention

The present invention relates to an automobile seat capable of preventing a seat occupant from suffering a whiplash injury when an automotive vehicle has come into a rear-end-collision.

2. Description of the Related Art

Automobile seats generally have a headrest mounted on an upper portion of a seat back. When a user sits on a seat, a predetermined clearance is present between a user's head and the headrest, but when an automotive vehicle has come into a rear-end-collision, a user's body moves rearward, and the user's head moves further rearward. Accordingly, a load is applied to a user's neck, thus resulting in a whiplash injury.

It is possible to reduce the clearance between the user's head and the headrest to minimize the injury. In this case, however, the user's head is often brought into contact with the headrest even in a normal sitting condition, and even a slight movement of the head causes the head to interfere with the headrest, thus making the user uncomfortable.

A headrest mounting structure for an automobile seat has been proposed in which a seat back frame is made up of an upper frame and a lower frame connected to each other via a hinge, and a headrest is mounted on an upper portion of the upper frame. In this headrest mounting structure, an impact plate is provided at a lower portion of the upper frame so as to confront a seat occupant's back, and a coil spring is also provided to bias the impact plate forward and the headrest rearward.

If an impact is applied to a rear portion of an automotive vehicle, the impact plate is moved rearward by a rearward movement of the seat occupant's body, followed by a forward movement of the headrest, which in turn supports the seat occupant's head (see, for example, Patent Document 1).

Document 1: Japanese Laid-Open Patent Publication No. 10-119619

In the case of the headrest mounting structure as disclosed in Document 1, however, the headrest and the seat back tend to return to initial positions thereof by a biasing force of the coil spring after the forward movement of the headrest and, hence, the support of the seat occupant's head becomes insufficient, thus giving rise to a problem that a strain on a cervical vertebra cannot be sufficiently reduced.

SUMMARY OF THE INVENTION

The present invention has been developed to overcome the above-described disadvantages.

It is accordingly an objective of the present invention to provide an automobile seat capable of reducing, in the event of a rear-end-collision, the strain on the cervical vertebra by moving the headrest forward to support the seat occupant's head and subsequently continuously support it even after the rear-end-collision.

In accomplishing the above and other objectives, the automobile seat according to the present invention includes a seat cushion having a seat cushion frame, a seat back tiltably mounted on the seat cushion, and a headrest mounted on an upper portion of the seat back. The automobile seat also includes a seat back frame having a pair of side frames mounted on the seat cushion frame and a sub-frame mounted to the side frames via a hinge so as to be swingable with respect to the side frames, a pressure member mounted on a lower portion of the sub-frame, and a swinging motion restraint mechanism for restraining a swinging motion of the sub-frame relative to the side frames. The swinging motion restraint mechanism includes a swing axis mounted on the sub-frame and swingable between a forward position and a rearward position, and an elastic member for biasing the swing axis. In an initial state in which no load is applied to the seat back, the swing axis is held at the forward position by an elastic force of the elastic member, and in a normal sitting condition in which a load less than a predetermined value is applied to the seat back, the swing axis is swingably held by the elastic force of the elastic member. When a load greater than the predetermined value is inputted to the seat back in a rearward direction, the pressure member is moved rearward to thereby move the swing axis rearward against the elastic force of the elastic member, swing the sub-frame about the hinge, move the headrest forward, and hold the headrest at a position after the movement by the elastic force of the elastic member. The seat back can be returned to the initial state by applying a force to the sub-frame against the elastic force of the elastic member.

Further, the swinging motion restraint mechanism includes a swinging motion restraint member rotatably mounted on one of the side frames and having a first contact portion and a second contact portion, both of which are brought into contact with the swing axis one at a time, wherein the elastic member biases the swinging motion restraint member toward the swing axis. In the initial state in which no load is applied to the seat back, the first contact portion of the swinging motion restraint member is held in contact with the swing axis, and when a load greater than the predetermined value is inputted to the seat back rearwardly, the second contact portion of the swinging motion restraint member is held in contact with the swing axis to thereby hold the headrest at the position after the movement.

Advantageously, the first contact portion of the swinging motion restraint member has an inward arcuate surface, and the second contact portion of the swinging motion restraint member has a generally straight or curved surface.

When the second contact portion of the swinging motion restraint member is brought into contact with the swing axis, a line of action of a force applied to the swing axis passes the hinge or a vicinity thereof.

Conveniently, the elastic member is a spiral spring, a coil spring, a plate spring, or a wire spring.

The swing axis may be loosely inserted in an elongated opening defined in the swinging motion restraint member. In the initial state in which no load is applied to the seat back, the elastic member applies a load to the swing axis in a first direction via the swinging motion restraint member, while when a load greater than the predetermined value is inputted to the seat back from before, the elastic member applies a load to the swing axis in a second direction different from the first direction via the swinging motion restraint member to thereby hold the headrest at the position after the movement.

In this case, the elastic member is a coil spring, and the swinging motion restraint member has one end pivotally connected to one of the side frames and the other end to which one end of the coil spring is secured. The other end of the coil spring is secured to the one of the side frames above a center of rotation of the swinging motion restraint member.

The elastic member may be so designed as to apply, in the initial state in which no load is applied to the seat back, a moment to the sub-frame in a first direction via the swing axis. In this case, when a load greater than the predetermined value is inputted to the seat back from before, the elastic member applies a moment to the sub-frame in a second direction different from the first direction to thereby hold the headrest at the position after the movement.

It is preferred that the swing axis be loosely inserted in an elongated opening defined in one of the side frames.

According to the present invention, during a normal motion of the seat occupant, the seat back can elastically support an upper part of the seat occupant's body, and a mechanism for moving the headrest forward does not work substantially. Accordingly, when the seat occupant leaves the seat, the seat back returns to an initial position. On the other hand, if a load greater than a predetermined value is inputted from behind an automotive vehicle in the event of, for example, a rear-end-collision, a lumbar part of the seat occupant moves the pressure member rearward to thereby swing the sub-frame about the hinge and move the headrest forward. Accordingly, the seat occupant's head can be quickly supported by the headrest.

Even after the rear-end-collision, because the headrest is held at the position after the movement, the seat occupant's head is continuously supported, thus making it possible to reduce a strain on a cervical vertebra of the seat occupant.

BRIEF DESCRIPTION OF THE DRAWINGS

The above and other objectives and features of the present invention will become more apparent from the following description of preferred embodiments thereof with reference to the accompanying drawings, throughout which like parts are designated by like reference numerals, and wherein.

DETAILED DESCRIPTION OF THE PREFERRED EMBODIMENTS

This application is based on an application No. 2008-266534 filed Oct. 15, 2008 in Japan, the content of which is herein expressly incorporated by reference in its entirety.

Figure 1:
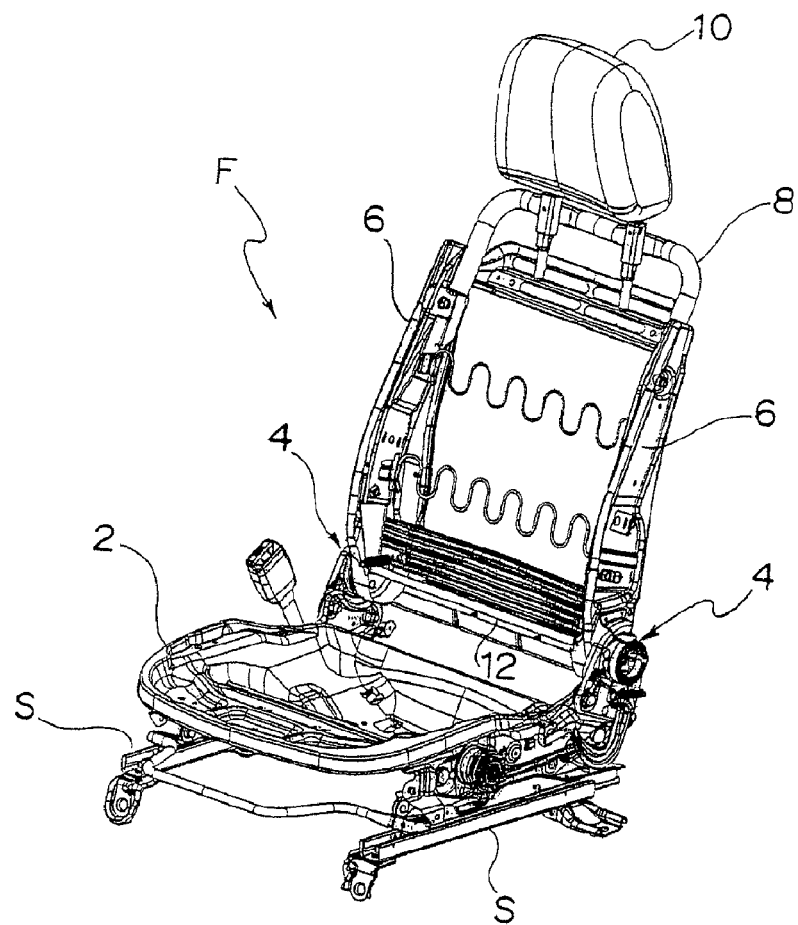
FIG. 1 is a perspective view of a seat frame of an automobile seat according to the present invention.

FIG. 1 depicts a seat frame F of an automobile seat according to the present invention, which includes a seat cushion frame 2 mounted on a pair of slide adjusters S for appropriately regulating a position of the seat in a longitudinal direction thereof, a pair of side frames 6 mounted on the seat cushion frame 2 via respective reclining devices 4, and a sub-frame 8 (headrest frame) mounted to the side frames 6. The side frames 6 and the sub-frame 8 constitute a seat back frame. A seat cushion and a seat back are mounted on the seat cushion frame 2 and the seat back frame 6, 8, respectively, and a headrest 10 is mounted on an upper portion of the sub-frame 8.

The pair of reclining devices 4 are connected to each other via a connecting shaft 12, and operation of an operation lever (not shown) mounted on one of the reclining devices 4 allows the side frames 6 to be set to a desired angle.

Each of the reclining devices 4 includes a seat cushion side bracket (not shown) secured to the seat cushion frame 2 and a seat back side bracket (not shown) rotatable relative to the seat cushion side bracket. The side frame 6 is secured to the seat back side bracket.

Embodiment 1

Figure 2:
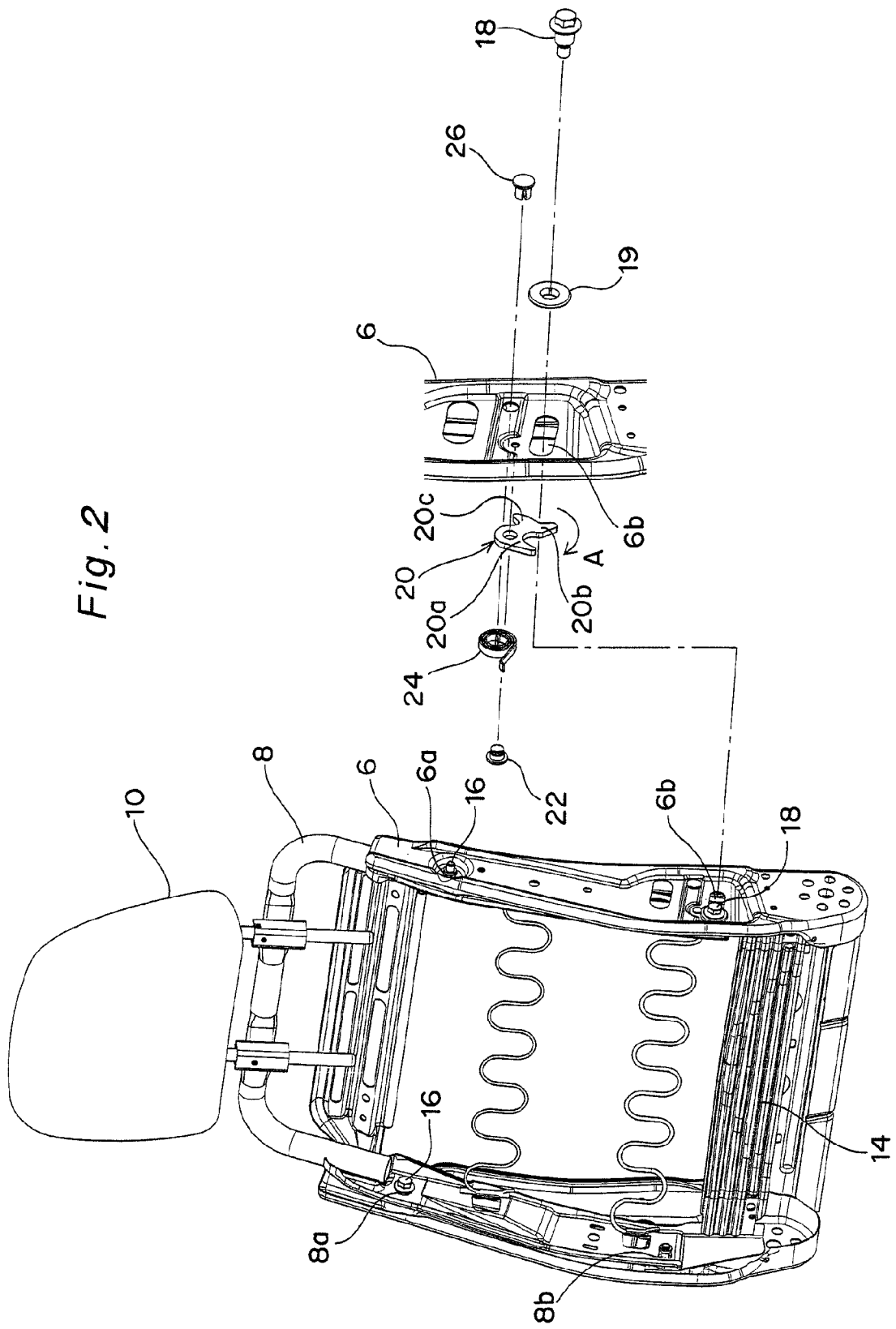
FIG. 2 is an exploded perspective view of a seat back frame of the automobile seat according to a first embodiment of the present invention.

FIG. 2 depicts a seat back frame of an automobile seat according to a first embodiment of the present invention. As shown in FIG. 2, each side frame 6 has a hinge insertion hole 6a defined in an upper portion thereof and an elongated opening 6b defined in a lower portion thereof in which a swing bolt (described later) is loosely inserted. The elongated opening 6b is formed into an arcuate shape having a center of curvature at the hinge insertion hole 6a.

On the other hand, the sub-frame 8 is bent in the form of an inverted U and, hence, has a horizontally extending portion and two vertically extending side portions, each of which extends downward from one end of the horizontally extending portion. Each side portion of the sub-frame 8 has a hinge insertion hole 8a at a location confronting the hinge insertion hole 6a in the side frame 6 and a swing bolt insertion hole 8b at a location confronting the elongated opening 6b in the side frame 6. The sub-frame 8 also has a pressure plate (pressure member) 14, opposite ends of which are respectively connected to the side portions of the sub-frame 8 below the swing bolt insertion holes 8b so as to confront a lumbar part of a seat occupant.

Under the condition in which the side portions of the sub-frame 8 are positioned inward of the pair of side frames 6, a hinge bolt 16 is inserted into the hinge insertion hole 8a in the sub-frame 8 and then into the hinge insertion hole 6a in the side frame 6 from the inside before it is screwed into a nut, and a swing bolt 18 is inserted into the elongated opening 6b in the side frame 6 and then into the swing bolt insertion hole 8b in the sub-frame 8 from the outside before it is screwed into a nut. A bush 19 is interposed between a head of the swing bolt 18 and the side frame 6 to make smooth a sliding movement of the swing bolt 18 with respect to the side frame 6.

Because the hinge bolt 16 is a center of rotation (swinging motion) of the sub-frame 8 relative to the side frame 6, almost no clearance is present between the hinge bolt 16 and a periphery of the hinge insertion hole 6a in the side frame 6, while a slight clearance is present between the swing bolt 18 and a periphery of the elongated opening 6b in the side frame 6 for smooth swinging motion of the sub-frame 8 relative to the side frame 6.

A swinging motion restraint member 20 for restraining the swinging motion of the sub-frame 8 relative to the side frame 6 is rotatably mounted on an inner surface of the side frame 6 above the elongated opening 6b via a pin 22. The swinging motion restraint member 20 has a first contact portion 20a formed adjacent a pin insertion hole (a hole in which the pin 22 is inserted, and a center of rotation) and having an inward arcuate surface facing downward, a second contact portion 20b formed rearward of the first contact portion 20a and having a generally straight surface, and a pressure portion 20c extending away from the generally straight surface of the second contact portion 20b in a direction generally perpendicular thereto.

A spiral spring 24 is disposed rearward of the swinging motion restraint member 20 as an elastic member for biasing the swing bolt 18. The spiral spring 24 has one end (inner end) hooked on the side frame 6 via a pin 26 and the other end (outer end) held in contact with the pressure portion 20c of the swinging motion restraint member 20 to press it, thereby biasing the swinging motion restraint member 20 in a direction of an arrow A.

Operation of the automobile seat according to the present invention of the above-described construction is explained hereinafter with reference to FIGS. 3A, 3B and 3C, and FIG. 4.

Figure 4:
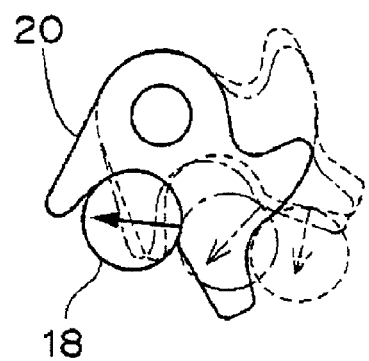
FIG. 4 is an enlarged view of the essential portion of the seat back frame of FIG. 2, particularly depicting a magnitude and a direction of a force applied to a swing range restraint bolt.
Figure 3A:
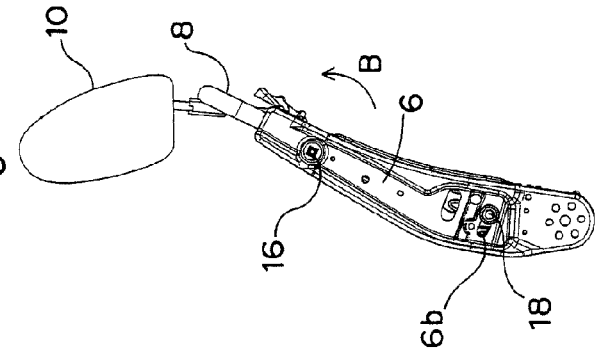
FIG. 3A is a side view of the seat back frame of FIG. 2 with an enlarged view of an essential portion thereof in an initial state in which a user sits on the seat, but no load is applied to a seat back.
Figure 3A:
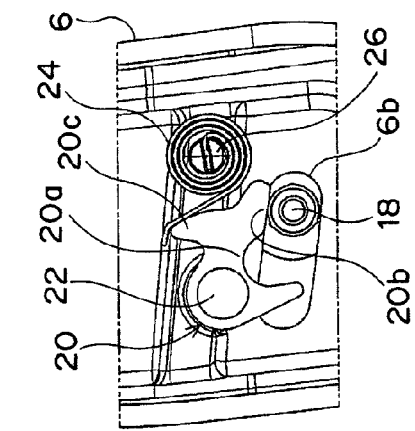
Figure 3B:
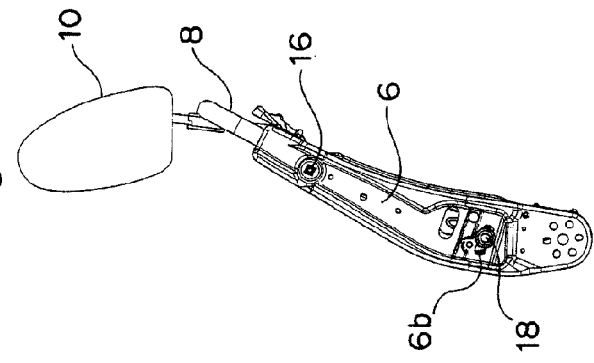
FIG. 3B is a view similar to FIG. 3A, but depicting a critical state in which a load (only a load of a seat occupant) less than a predetermined value has been applied to the seat back by the seat occupant.
Figure 3B:
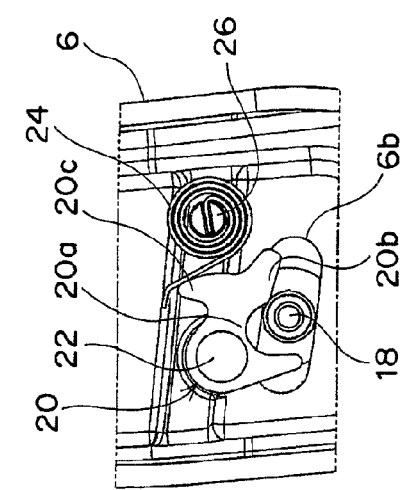
Figure 3C:
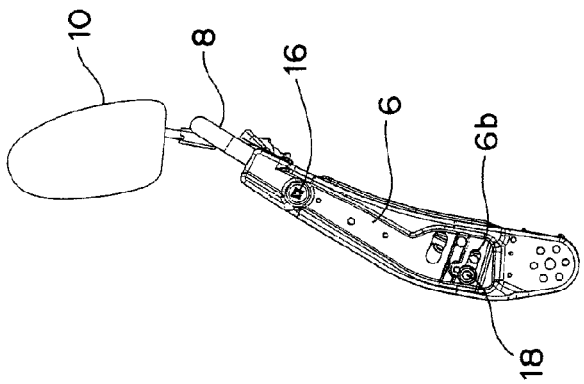
FIG. 3C is a view similar to FIG. 3A, but depicting an operating condition of a sub-frame in which a load greater than the predetermined value has been inputted from behind an automotive vehicle.
Figure 3C:
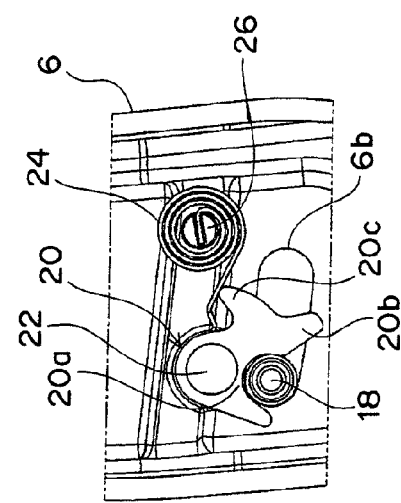

FIG. 3A depicts an initial state in which a user sits on the seat, but no load is applied to the seat back, while FIG. 3B depicts a critical state in which a load (only a load of a seat occupant) less than a predetermined value has been applied to the seat back by the seat occupant. In a state between the state of FIG. 3A and that of FIG. 3B, a load less than the predetermined value but greater than any possible loads in a normal sitting condition is inputted to the seat back. FIG. 3C depicts an operating condition of the sub-frame 8 in which a load (load of the seat occupant) greater than the predetermined value has been inputted to the seat back, for example, when a load greater than a predetermined value has been applied to the automotive vehicle from behind in the event of a rear-end-collision. The elastic force of the spiral spring 24 acts on the swing bolt 18 via the swinging motion restraint member 20, and FIG. 4 depicts a magnitude and a direction of the force applied to the swing bolt 18. In FIG. 4, a solid line indicates the initial state as shown in FIG. 3A, a single dotted chain line indicates the critical state as shown in FIG. 3B, and a double dotted chain line indicates a state after the sub-frame 8 has operated.

In the initial state as shown in FIG. 3A, a force directed forward along a longitudinal direction of the elongated opening 6b and slightly obliquely upward acts on the swing bolt 18 and, hence, the swing bolt 18 is positioned at a front end portion of the elongated opening 6b. In the critical state as shown in FIG. 3B, the swing bolt 18 moves rearward from the position as shown in FIG. 3A depending on a load of an upper part of the seat occupant's body, and is pressed by a protrusion between the first contact portion 20a and the second contact portion 20b of the swinging motion restraint member 20. Accordingly, a force directed generally forward and obliquely downward acts on the swing bolt 18. At this moment, the swing bolt 18 is held by the elastic force of the spiral spring 24 so as to be swingable within a very narrow range behind the front end portion of the elongated opening 6b, thereby enhancing sitting comfort. The range in which the swing bolt 18 is swingable depends on the load of the upper part of the seat occupant's body and the elastic force of the spiral spring 24. The headrest 10 mounted on the upper portion of the sub-frame 8 is apart a predetermined distance from a seat occupant's head.

On the other hand, in the operating condition as shown in FIG. 3C after a load greater than the predetermined value has been inputted from behind the automotive vehicle, the seat occupant's body is pressed against the seat back, and the lumbar part of the seat occupant pushes the pressure plate 14 provided at the lower portion of the sub-frame 8 rearward. As a result, the sub-frame 8 rotates about the hinge bolt 16 in a direction of an arrow B against the elastic force of the spiral spring 24, and lower end portions of the sub-frame 8 move rearward. Accordingly, the swing bolt 18 moves along the elongated opening 6b from the front end portion toward a rear end portion thereof and, hence, the headrest 10 moves toward the seat occupant's head to support it.

Figure 5:
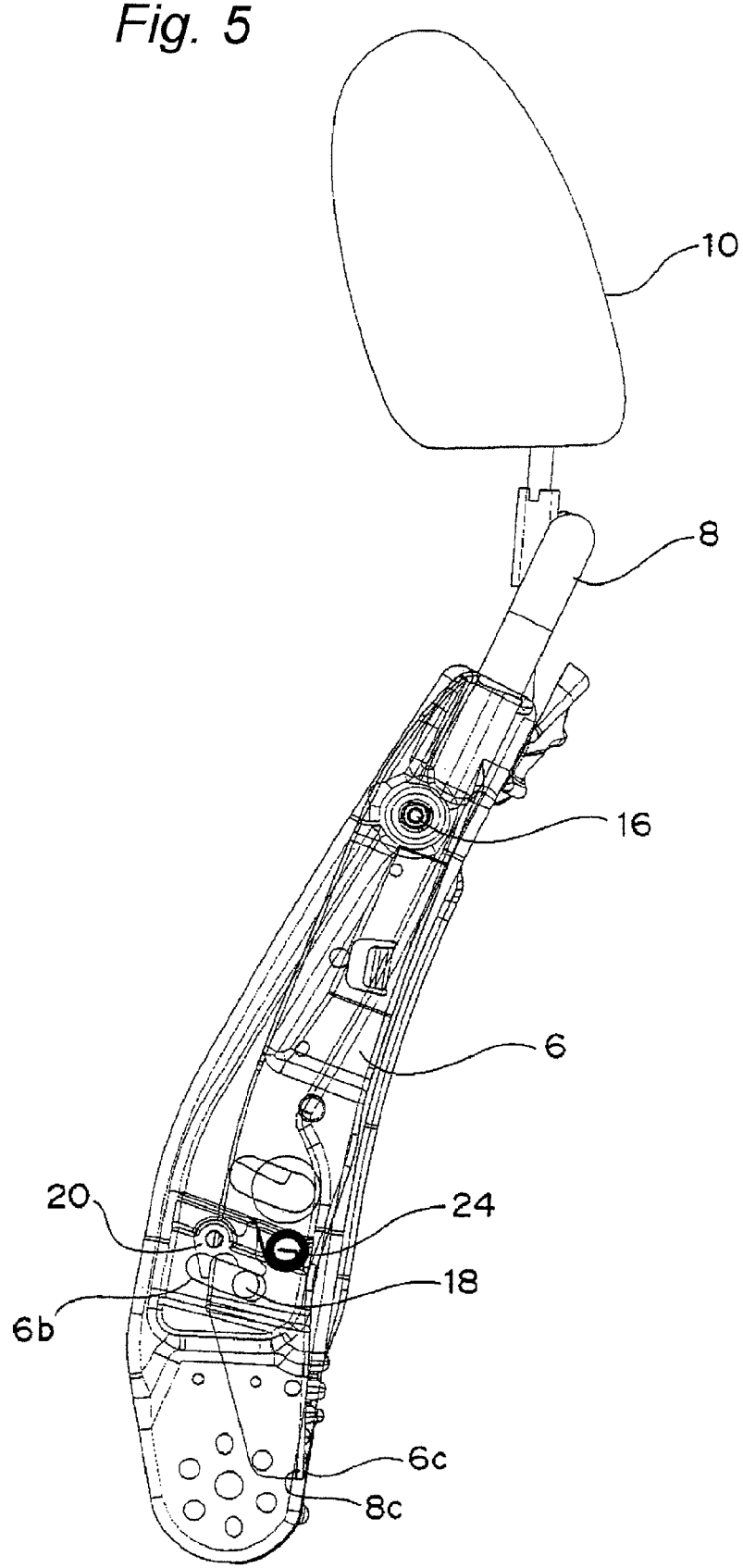
FIG. 5 is a side view of the seat back frame of FIG. 2.

As shown in FIG. 5, the side frame 6 has a sub-frame supporting portion 6c formed at a lower end portion thereof and extending widthwise of the automotive vehicle so as to confront a lower end portion 8c of the sub-frame 8. If a load greater than the predetermined value has been inputted from behind the automotive vehicle, the lower end portion 8c of the sub-frame 8 is brought into contact with the sub-frame supporting portion 6c of the side frame 6 to thereby stop a further rearward movement of the lower end portion 8c of the sub-frame 8.

After the rear-end-collision, the swing bolt 18 is pressed by the second contact portion 20b of the swinging motion restraint member 20, and a force directed generally downward acts on the swing bolt 18 to thereby hold the swing bolt 18 at the current position. Accordingly, a condition in which the seat occupant's head is supported by the headrest 10 is maintained, and his or her cervical vertebra is continuously supported, thus making it possible to reduce a strain on the cervical vertebra.

That is, the swing bolt 18 acts as a swing axis, and the elongated opening 6b in the side frame 6, the swing bolt 18 loosely inserted in the elongated opening 6b, the swinging motion restraint member 20 for applying the force shown in FIG. 4 to the swing bolt 18, the spiral spring 24 for biasing the swinging motion restraint member 20, and the like act as a swinging motion restraint mechanism.

The elastic force of the spiral spring 24 is set for proper operation of the sub-frame 8 in consideration of the load to be inputted.

Figure 6:
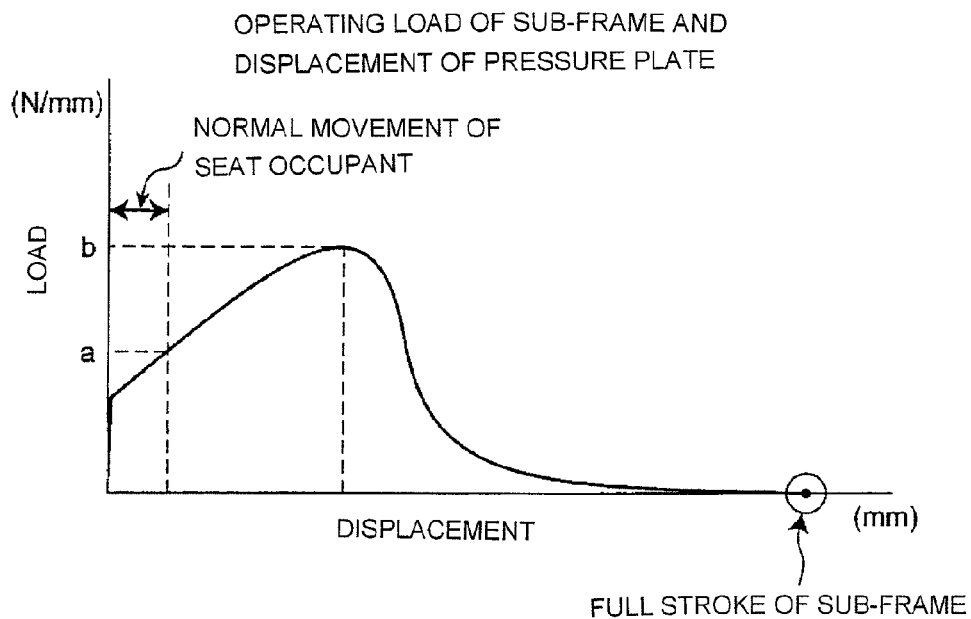
FIG. 6 is a graph indicating a relationship between an operating load of the sub-frame and a displacement of a pressure plate.

FIG. 6 is a graph indicating a relationship between an operating load of the sub-frame 8 and a displacement of the pressure plate 14. In this graph, a load (a) is a maximum load assumed to be applied to the seat back during normal use, and a load range from zero to (a) provides elasticity and does not spoil sitting comfort. This graph also indicates that when the sub-frame 8 comes to receive no operating load, the displacement of the pressure plate 14 becomes zero, and the sub-frame 8 automatically returns to the initial position.

If the load applied to the seat back exceeds a predetermined value (load b), the sub-frame 8 operates as far as a maximum or full stroke, i.e., until the lower end portion 8c of the sub-frame 8 is brought into contact with the sub-frame supporting portion 6c formed at the lower end portion of the side frame 6. At this moment, the operating load of the sub-frame 8 becomes zero or negative (direction counter to the direction in which the sub-frame returns to the initial position), the sub-frame 8 cannot automatically return to the initial position, but can be returned to the initial position by applying a rearward force to an upper portion of the sub-frame 8 or applying a forward force to a lower portion of the sub-frame 8. It is to be noted that a small force obtained by pushing with a hand is sufficient for this force.

Further, as can be seen from FIGS. 4 and 6, the swing bolt 18 is held in contact with the arcuate surface of the first contact portion 20a of the swinging motion restraint member 20 in the range from the initial or normal position to the critical position and, hence, the swing bolt 18 receives forces of different magnitudes in different directions. In the operating position, however, the swing bolt 18 is held in contact with the generally straight surface of the second contact portion 20b of the swinging motion restraint member 20, and receives a force of an identical magnitude in an identical direction.

Figure 7A:
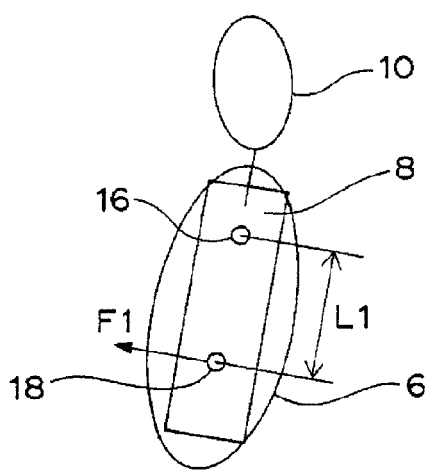
FIG. 7A is a schematic view depicting a load applied to the swing range restraint bolt in a normal condition of the seat back.
Figure 7B:
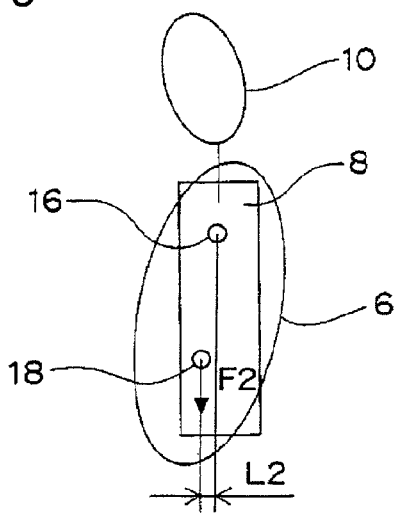
FIG. 7B is a view similar to FIG. 7A, but depicting an operating condition of the seat back.

FIGS. 7A and 7B schematically depict a load acting on the swing bolt 18 in the normal condition and the operating condition of the seat back, respectively.

In the normal condition as shown in FIG. 7A, a generally forward load F1 is applied to the swing bolt 18. When a distance between the swing bolt 18 and a center of rotation of the headrest 10 (hinge bolt 16) in a direction perpendicular to the load F1 is L1, a clockwise moment of M1=F1×L1 is applied to the sub-frame 8.

On the other hand, in the operating condition as shown in FIG. 7B, a generally downward load F2 is applied to the swing bolt 18. When a distance between the swing bolt 18 and the center of rotation of the headrest 10 (hinge bolt 16) in a direction perpendicular to the load F2 is L2, a moment of M2=F2×L2 is applied to the sub-frame 8.

In this condition, a line of action of the force is set to pass the hinge bolt 16 or its vicinity (L2≈0) and, hence, M2=F2×L2≈0 and M1>>M2. Accordingly, the load F1 can sufficiently support the load of the seat occupant in the normal condition, while the seat back can be returned to the initial position by applying only a small force to the sub-frame 8 after the operation.

Figure 8:
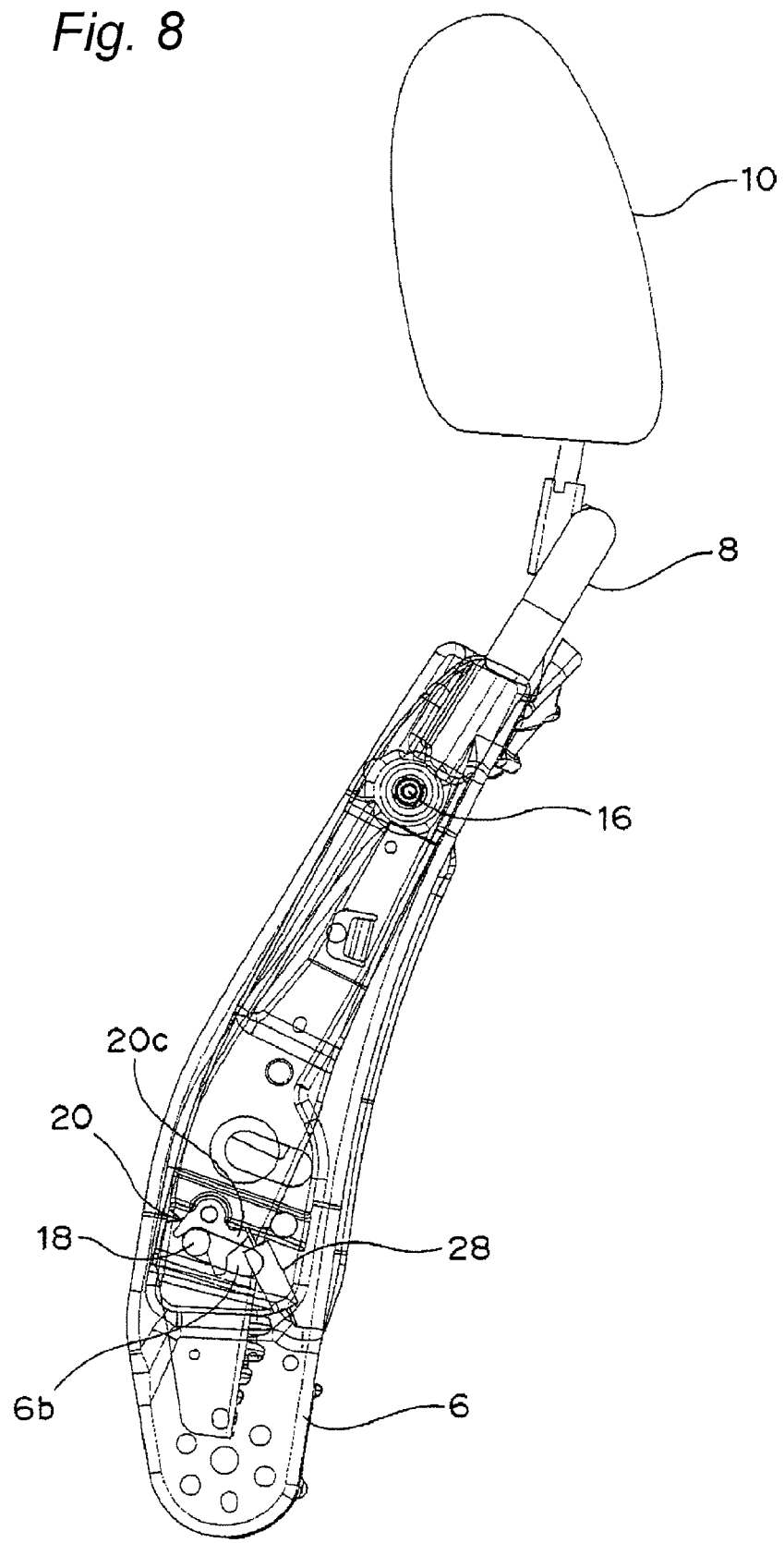
FIG. 8 is a side view of the seat back frame depicting a modified form of the automobile seat according to the first embodiment of the present invention.

FIG. 8 depicts a modified form of the embodiment referred to above, in which a coil spring (tension spring) 28 is used in place of the spiral spring 24. One end of the coil spring 28 is hooked on the pressure portion 20c of the swinging motion restraint member 20, and the other end of the coil spring 28 is hooked on a portion of the side frame 6 to thereby apply the force as shown in FIG. 4 to the swing bolt 18.

An elastic member such as, for example, a plate spring or a wire spring can be used in place of the spiral spring 24 or the coil spring 28.

Although in the above-described embodiment the second contact portion 20b of the swinging motion restraint member 20 has been described as having a generally straight surface, the second contact portion 20b may have a curved surface. In this case, when the swing bolt 18 is brought into contact with the second contact portion 20b of the swinging motion restraint member 20 in the operating condition, the swing bolt 18 comes to receive forces of a substantially identical magnitude in different directions, but the fact remains that the sub-frame 8 can be returned to the initial position by applying a force thereto.

Embodiment 2

Figure 9A:
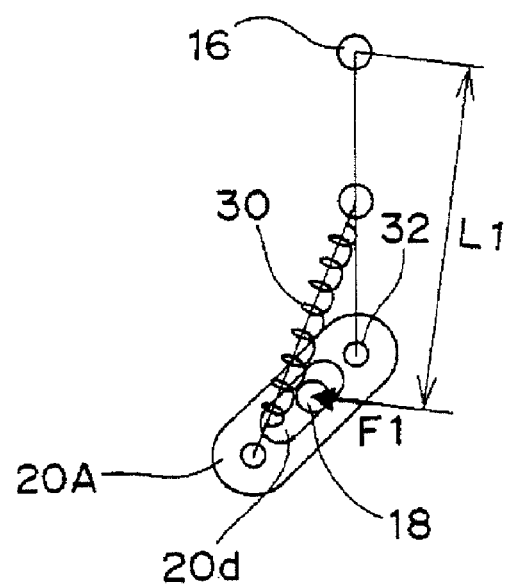
FIG. 9A is a side view of an essential portion of a seat back frame of an automobile seat according to a second embodiment of the present invention in an initial state before the user sits on the seat.
Figure 9B:
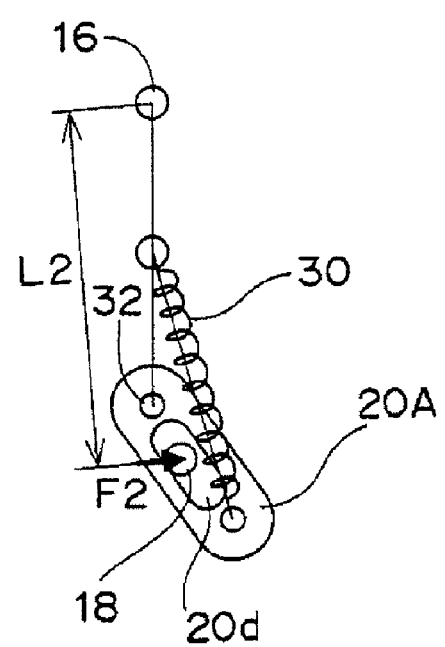
FIG. 9B is a view similar to FIG. 9A, but depicting an operating condition of the sub-frame when a load greater than the predetermined value has been inputted from behind the automotive vehicle.

FIGS. 9A and 9B schematically depict an essential portion of an automobile seat according to a second embodiment of the present invention wherein a swinging motion restraint member (swinging motion restraint plate) 20A and a coil spring (tension spring) 30 are used in place of the swinging motion restraint member 20 and the spiral spring 24 (or the coil spring 28) used in the first embodiment.

More specifically, one end (upper end) of the swinging motion restraint plate 20A is pivotally connected to the side frame 6 above the elongated opening 6b via a pin 32, and one end (lower end) of the coil spring 30 is secured to the other end (lower end) of the swinging motion restraint plate 20A. The other end (upper end) of the coil spring 30 is secured to the side frame 6 above the pin 32, thereby applying a clockwise or counterclockwise moment to the swinging motion restraint plate 20A. It is preferred that the other end of the coil spring 30 be positioned between the hinge bolt 16 and the pin 32 and on a line that links the hinge bolt 16 and the pin 32 or in the vicinity thereof.

The swinging motion restraint plate 20A has an elongated opening 20d defined in a middle portion thereof so as to extend along a longitudinal direction thereof, and the swing bolt 18 is loosely inserted in the elongated opening 20d.

In the initial state before a user sits on the seat, the swing bolt 18 is positioned at the front end portion of the elongated opening 6b, and as shown in FIG. 9A, a generally forward load F1 is applied to the swing bolt 18 by an elastic force of the coil spring 30 to thereby apply a clockwise moment (F1×L1) to the sub-frame 8.

In the normal sitting condition in which a load less than the predetermined value is applied to the seat back, the swing bolt 18 moves rearward from the initial position depending on a load of an upper part of the seat occupant's body, but the elastic force of the coil spring 30 is set such that even if a maximum load assumed in normal use (normal sitting condition) is applied to the seat back, the lower end of the coil spring 30 is positioned ahead of a change point that is positioned on an extension of a line linking the upper end of the coil spring 30 and the pin 32.

On the other hand, if a load greater than the predetermined value is inputted from behind the automotive vehicle, the lumbar part of the seat occupant pushes the pressure plate 14 provided at the lower portion of the sub-frame 8 rearward. As a result, as shown in FIG. 9B, the sub-frame 8 rotates about the hinge bolt 16 against the elastic force of the coil spring 30, and lower end portions of the sub-frame 8 move rearward. Accordingly, the swing bolt 18 moves along the elongated opening 6b from the front end portion toward a rear end portion thereof and, hence, the headrest 10 moves toward the seat occupant's head to support it.

After the rear-end-collision, a rearward load F2 is applied to the swing bolt 18 by the elastic force of the coil spring 30 and, hence, a counterclockwise moment (F2×L2) is applied to the sub-frame 8 to thereby hold the swing bolt 18 at the current position. Accordingly, a condition in which the seat occupant's head is supported by the headrest 10 is maintained, and his or her cervical vertebra is continuously supported, thus making it possible to reduce a strain on the cervical vertebra.

In this embodiment, the swing bolt 18 acts as a swing axis, and the elongated opening 6b in the side frame 6, the swing bolt 18 loosely inserted in the elongated opening 6b, the swinging motion restraint plate 20A through which the swing bolt 18 extends, the coil spring 30 for biasing the swinging motion restraint plate 20A, and the like act as a swinging motion restraint mechanism.

In this embodiment also, the load of the seat occupant can be sufficiently supported in the normal condition, and the sub-frame 8 cannot automatically return to the initial position after the operation, but can be returned to the initial position by applying a rearward force to an upper portion of the sub-frame 8 or applying a forward force to a lower portion of the sub-frame 8.

Embodiment 3

Figure 10A:
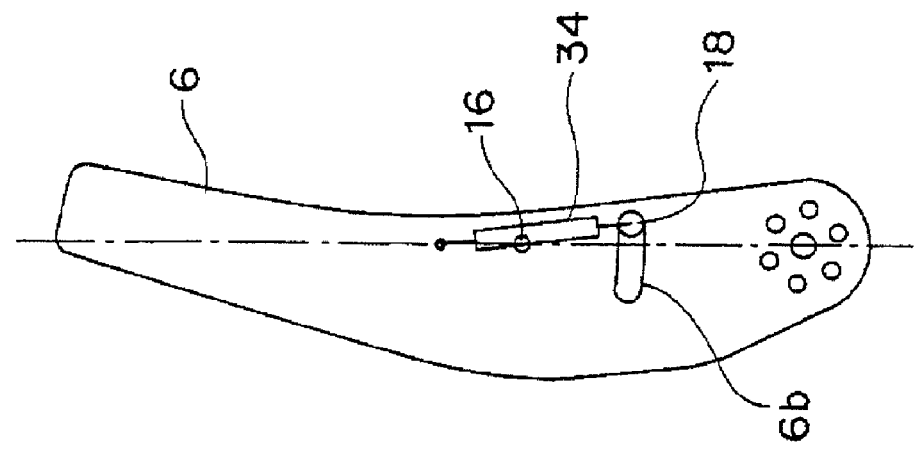
FIG. 10A is a side view of a seat back frame of an automobile seat according to a third embodiment of the present invention in an initial state before the user sits on the seat.
Figure 10B:
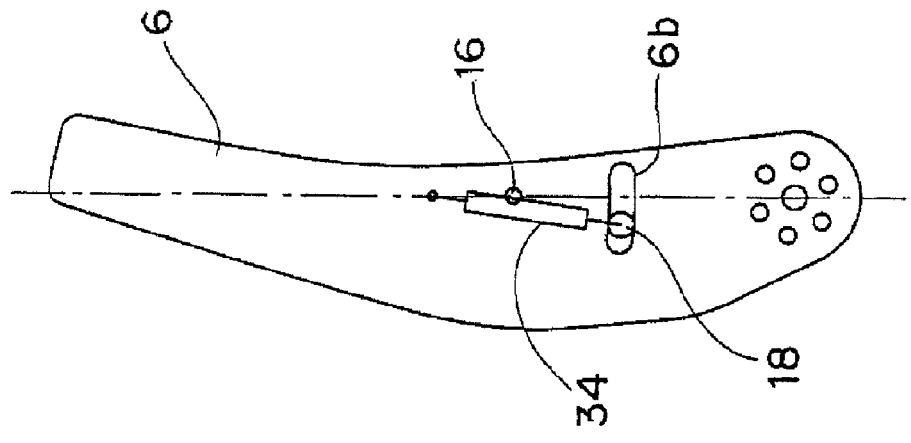
FIG. 10B is a view similar to FIG. 10A, but depicting a normal condition in which a load less than the predetermined value has been applied to the seat back by the seat occupant.
Figure 10C:
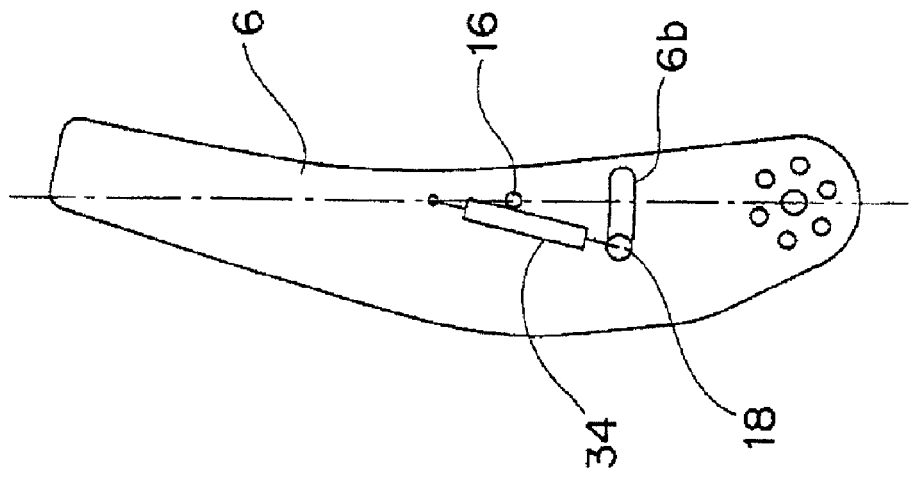
FIG. 10C is a view similar to FIG. 10A, but depicting an operating condition of the sub-frame when a load greater than the predetermined value has been inputted from behind the automotive vehicle.

FIGS. 10A, 10B and 10C schematically depict a side frame of an automobile seat according to a third embodiment of the present invention wherein an elastic force of a coil spring (tension spring) 34 directly acts on the swing bolt 18 without the provision of the swinging motion restraint member 20 or 20A.

FIG. 10A depicts an initial state before a user sits on the seat, and FIG. 10B depicts a normal sitting condition in which a load less than the predetermined value is applied to the seat back. FIG. 10C depicts an operating condition of the sub-frame 8 when a load greater than the predetermined value is inputted to the seat back from before in the event of, for example, a rear-end-collision.

More specifically, one end (lower end) of the coil spring 34 is secured to the swing bolt 18, and the other end (upper end) of the coil spring 34 is secured to the side-frame 6 above the hinge bolt 16. A downward extension of a line that links the hinge bolt 16 and a position where the other end of the coil spring 34 is secured to the side frame 6 is set so as to pass through an intermediate portion of the elongated opening 6b.

In the initial state as shown in FIG. 10A before the user sits on the seat, the swing bolt 18 is positioned at the front end portion of the elongated opening 6b, and a clockwise moment is applied to the sub-frame 8 by an elastic force of the coil spring 34 acting on the swing bolt 18.

As shown in FIG. 10B, in the normal sitting condition in which a load less than the predetermined value is applied to the seat back, the swing bolt 18 moves rearward from the initial position depending on a load of an upper part of the seat occupant's body, but the elastic force of the coil spring 34 is set such that even if a maximum load assumed in normal use (normal sitting condition) is applied to the seat back, the swing bolt 18 is positioned ahead of a change point that is positioned on the downward extension of the line linking an upper end of the coil spring 34 and the hinge bolt 16. Accordingly, similar to the initial state, a clockwise moment is applied to the sub-frame 8 by the elastic force of the coil spring 34 acting on the swing bolt 18 and, hence, when the seat occupant leaves the seat and no load is applied to the seat back, the sub-frame 8 automatically returns to the initial position.

On the other hand, if a load greater than the predetermined value is inputted to the seat back from before in the event of, for example, a rear-end-collision, the lumbar part of the seat occupant pushes the pressure plate 14 provided at the lower portion of the sub-frame 8 rearward. As a result, as shown in FIG. 10C, the sub-frame 8 rotates about the hinge bolt 16 against the elastic force of the coil spring 34, and lower end portions of the sub-frame 8 move rearward. Accordingly, the swing bolt 18 moves along the elongated opening 6b from the front end portion toward a rear end portion thereof and, hence, the headrest 10 moves toward the seat occupant's head to support it.

After the rear-end-collision, a counterclockwise moment is applied to the sub-frame 8 by the elastic force of the coil spring 34 to thereby hold the swing bolt 18 at the current position. Accordingly, a condition in which the seat occupant's head is supported by the headrest 10 is maintained, and his or her cervical vertebra is continuously supported, thus making it possible to reduce a strain on the cervical vertebra.

In this embodiment, the swing bolt 18 acts as a swing axis, and the elongated opening 6b in the side frame 6, the swing bolt 18 loosely inserted in the elongated opening 6b, the coil spring 34 for biasing the swing bolt 18, and the like act as a swinging motion restraint mechanism.

In this case also, the sub-frame 8 cannot automatically return to the initial position after the operation, but can be returned to the initial position by applying a rearward force to an upper portion of the sub-frame 8 or applying a forward force to a lower portion of the sub-frame 8.

It is to be noted that although FIGS. 10A, 10B and 10C extremely schematically depict the third embodiment of the present invention for ease of understanding, it is in fact preferred that the hinge bolt 16 be set above a position shown in FIGS. 10A, 10B and 10C and that the position where the upper end of the coil spring 34 is secured to the side frame 6 be set further above the hinge bolt 16.

It is also to be noted that the amount of stroke of the headrest 10 can be appropriately regulated by changing the position of the hinge bolt 16 to thereby change the distance between the hinge bolt 16 and the swing bolt 18 or by changing the length of the elongated opening 6b.

As described above, because the automobile seat according to the present invention can support the seat occupant's head in the event of a rear-end-collision by quickly moving the headrest forward, it is useful for automobile seats capable of preventing the seat occupant from suffering a whiplash injury with a simple construction.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. An automobile seat including a seat cushion having a seat cushion frame, a seat back tiltably mounted on the seat cushion, and a headrest mounted on an upper portion of the seat back, said automobile seat comprising:

a seat back frame having a pair of side frames mounted on the seat cushion frame and a sub-frame mounted to the side frames via a hinge so as to be swingable with respect to the side frames;

a pressure member mounted on a lower portion of the sub-frame; and a swinging motion restraint mechanism for restraining a swinging motion of the sub-frame relative to the side frames, said swinging motion restraint mechanism comprising a swing axis mounted on the sub-frame and swingable between a forward position and a rearward position, and an elastic member for biasing the swing axis;

wherein in an initial state in which no load is applied to the seat back, the swing axis is held at the forward position by an elastic force of the elastic member, and in a normal sitting condition in which a load less than a predetermined value is applied to the seat back, the swing axis is swingably held by the elastic force of the elastic member;

when a load greater than the predetermined value is inputted to the seat back in a rearward direction, the pressure member is moved rearward to thereby move the swing axis rearward against the elastic force of the elastic member, swing the sub-frame about the hinge, move the headrest forward, and hold the headrest at a position after the movement by the elastic force of the elastic member; and wherein the seat back can be returned to the initial state by applying a force to the sub-frame against the elastic force of the elastic member.

2. The automobile seat according to claim 1, wherein the swinging motion restraint mechanism comprises a swinging motion restraint member rotatably mounted on one of the side frames and having a first contact portion and a second contact portion, both of which are brought into contact with the swing axis one at a time, wherein the elastic member biases the swinging motion restraint member toward the swing axis, and wherein in the initial state in which no load is applied to the seat back, the first contact portion of the swinging motion restraint member is held in contact with the swing axis, and when a load greater than the predetermined value is inputted to the seat back in a rearward direction, the second contact portion of the swinging motion restraint member is held in contact with the swing axis to thereby hold the headrest at the position after the movement.

3. The automobile seat according to claim 2, wherein the first contact portion of the swinging motion restraint member has an inward arcuate surface, and the second contact portion of the swinging motion restraint member has a generally straight or curved surface.

4. The automobile seat according to claim 2, when the second contact portion of the swinging motion restraint member is brought into contact with the swing axis, a line of action of a force applied to the swing axis passes the hinge or a vicinity thereof.

5. The automobile seat according to claim 1, wherein the elastic member comprises one of a spiral spring, a coil spring, a plate spring, and a wire spring.

6. The automobile seat according to claim 1, wherein the swinging motion restraint mechanism comprises a swinging motion restraint member rotatably mounted on one of the side frames, wherein the elastic member biases the swinging motion restraint member to thereby bias the swing axis, which is loosely inserted in an elongated opening defined in the swinging motion restraint member, wherein in the initial state in which no load is applied to the seat back, the elastic member applies a load to the swing axis in a first direction via the swinging motion restraint member, while when a load greater than the predetermined value is inputted to the seat back in a rearward direction, the elastic member applies a load to the swing axis in a second direction different from the first direction via the swinging motion restraint member to thereby hold the headrest at the position after the movement.

7. The automobile seat according to claim 6, wherein the elastic member comprises a coil spring, and the swinging motion restraint member has one end pivotally connected to one of the side frames and the other end to which one end of the coil spring is secured, and wherein the other end of the coil spring is secured to the one of the side frames above a center of rotation of the swinging motion restraint member.

8. The automobile seat according to claim 1, wherein in the initial state in which no load is applied to the seat back, the elastic member applies a moment to the sub-frame in a first direction via the swing axis, and when a load greater than the predetermined value is inputted to the seat back in a rearward direction, the elastic member applies a moment to the sub-frame in a second direction different from the first direction to thereby hold the headrest at the position after the movement.

9. The automobile seat according to claim 1, wherein the swing axis is loosely inserted in an elongated opening defined in one of the side frames.

* * * * *